(12) United States Patent
Dang et al.

(10) Patent No.: US 8,163,354 B2
(45) Date of Patent: Apr. 24, 2012

(54) PROCESS FOR OBTAINING A HARD COATED ARTICLE HAVING ANTI-FOULING PROPERTIES

(75) Inventors: Hoa Thien Dang, Tampa, FL (US); Sheila Tatman, Seminole, FL (US); Robert Valeri, Tampa, FL (US)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 1035 days.

(21) Appl. No.: 11/420,793

(22) Filed: May 29, 2006

(65) Prior Publication Data

US 2007/0275171 A1    Nov. 29, 2007

(51) Int. Cl.
*B05D 3/02*    (2006.01)

(52) U.S. Cl. ........ 427/487; 427/493; 427/495; 427/508; 427/515; 427/517; 427/387; 427/407.1; 427/407.2; 427/412.1

(58) Field of Classification Search .......... None
See application file for complete search history.

(56) References Cited

U.S. PATENT DOCUMENTS

| | | | | |
|---|---|---|---|---|
| 4,410,563 A | 10/1983 | Richter et al. | ................ | 427/108 |
| 5,741,831 A | 4/1998 | Keita et al. | .................... | 523/106 |
| 6,183,872 B1 | 2/2001 | Tanaka et al. | ................. | 428/429 |
| 6,277,485 B1 | 8/2001 | Invie et al. | .................... | 428/336 |
| 7,264,669 B1 * | 9/2007 | Tomasino et al. | ........ | 106/287.11 |
| 2001/0033934 A1 * | 10/2001 | Port et al. | ....................... | 428/421 |
| 2004/0047047 A1 * | 3/2004 | Yamaguchi et al. | .......... | 359/666 |
| 2005/0095432 A1 * | 5/2005 | Hayashida et al. | ........ | 428/411.1 |
| 2005/0112365 A1 * | 5/2005 | Hayashida et al. | ........... | 428/336 |
| 2007/0104891 A1 * | 5/2007 | Fournand | ..................... | 427/561 |

FOREIGN PATENT DOCUMENTS

| | | |
|---|---|---|
| EP | 0203730 | 4/1986 |
| EP | 789050 * | 8/1997 |
| EP | 0749021 | 11/1997 |
| EP | 0844265 | 5/1998 |
| EP | 0933377 | 12/2000 |
| EP | 1480061 | 11/2004 |
| FR | 2734827 | 5/1995 |
| JP | 6-087190 | 3/1994 |
| JP | 2000-308846 | 11/2000 |
| WO | WO 02/00561 | 1/2002 |
| WO | WO 2004/063300 | 7/2004 |
| WO | WO 2005/012955 | 2/2005 |
| WO | WO 2007/051841 | 5/2007 |

* cited by examiner

*Primary Examiner* — Erma Cameron
(74) *Attorney, Agent, or Firm* — Fulbright & Jaworski L.L.P.

(57) ABSTRACT

Process for obtaining a hard coated article having anti-fouling properties, including, for example, an optical article such as an ophthalmic lens, comprising a substrate coated with a hard coating providing abrasion resistance and hardness and adhesion to the anti-fouling coating, and the article obtained from such process.

23 Claims, No Drawings

US 8,163,354 B2

PROCESS FOR OBTAINING A HARD COATED ARTICLE HAVING ANTI-FOULING PROPERTIES

BACKGROUND OF THE INVENTION

1. Field of the Invention

The invention relates to a process for obtaining a hard coated article having anti-fouling properties, especially an optical article such as an ophthalmic lens, comprising a substrate coated with a hard coating providing good abrasion resistance and hardness and good adhesion to the anti-fouling coating and the article such obtained.

2. Description of Related Art

It is a common practice in the art to coat at least one main surface of a lens substrate, such as an ophthalmic lens, with several coatings for imparting to the lens substrate additional or improved optical or mechanical properties. These coatings are designated in general as functional coatings.

Thus, it is usual practice to coat at least one main surface of a lens substrate, typically made of an organic glass material, with successively, starting from the surface of the lens substrate, an abrasion- and/or scratch-resistant coating (hard coat), an anti-reflection coating and an anti-fouling top coat that will prevent the adhesion of stains or will render easier the removal of stains.

However, it has been difficult up to now to provide an article having a hard coat and an anti-fouling coating deposited directly thereon because it is particularly difficult to obtain a good adhesion between the hard coat and the anti-fouling coating.

JP 2000-308846 describes a method intending to solve the problem of forming an anti-fouling layer on a base material, such as an optical part, which has excellent anti-fouling properties, scratch-resistance and solvent resistance.

According to this method, before forming said anti-fouling layer, at least one surface of the base material which is to be treated is pre-treated and the anti-fouling layer is formed on this pre-treated surface.

The pre-treatment involves the following methods: high frequency discharge plasma method, electron beam method, ion beam method, vapor deposition method, sputtering method, alkali treatment method, acid treatment method, corona treatment method or atmospheric pressure glow discharge method.

Practically, the pre-treatment is made on an inorganic layer of an anti-reflection coating.

Document US 2005112365 (TDK Corporation) addresses specifically the problem of adhesion between an anti-fouling top coat and a hard coating and discloses a substrate having:
- a hard coating composition comprising a silicon compound or a hydrolyzate thereof;
- a layer of an anti-staining and/or lubricating functional material that comprises a silicon compound deposited thereon and adhering to the hard coat.

The substrate can be an optical lens and the silicon compounds of the hard coat are organic alkoxy silanes.

The hard coating composition may comprise organic compounds that polymerize and cure upon irradiation with active energy rays.

As examples of such organic compounds, the above referred TDK Patent Application cites monomers and oligomers of organic compounds that undergo cationic polymerization such as epoxy compounds and organic compounds comprising one or more unsaturated double bond used in a ratio of 10 to 2000 parts by weight per 100 parts by weight of silicon compound in the hard coating composition.

According to the process described in US Patent Application 2005112365, the hard coating composition is half cured, i.e. is partially cured. Then the anti-fouling coating composition is deposited and the obtained stack is further cured by heating to get a final product.

In practice, in the examples of the above referred TDK Patent Application, the hard coating is not half-cured but simply dried so as to remove the solvent.

A disadvantage of this technique is that the properties of the top coat may be decreased.

Accordingly, there is still a need of providing a process for improving the adhesion of an anti-fouling top coat to a hard, abrasion-resistant coating.

SUMMARY OF THE INVENTION

A first aim of the invention is to provide a new process for obtaining a transparent optical article, preferably a lens, and more preferably an ophthalmic lens for eyeglasses, comprising a substrate bearing a hard coating, and deposited thereon, a layer having anti-fouling properties firmly adhering to the hard coating.

A second aim of the invention is to provide a new process for obtaining a transparent optical article having a hard coat and an anti-fouling top coat firmly adhering to the hard coating and which preserves the surface properties of the top coat.

The inventors have found that these problems may be solved by partially polymerizing specific hard coating compositions under cationic cure, followed by deposition of the anti-fouling top coat composition and subsequent heating of the article obtained.

Consequently, there is provided a process for obtaining a hard coated article having anti-fouling properties comprising the steps of:

a) applying onto the surface of a substrate a hard coating polymerizable composition selected from:

α) a hard coating composition A comprising:
- at least one silicon compound having at least one hydrolyzable group directly linked to the silicon atom and at least one epoxy group, and/or a condensation compound thereof, and
- at least one cationic polymerization initiator, β) a hard coating composition B comprising:
- at least one epoxy compound which is neither a hydrolysis-polymerizable silicon compound nor a condensation compound thereof,
- less than 5% by weight of alkoxysilane compounds and condensation compounds thereof with respect to the weight of polymerizable compounds, and
- at least one cationic polymerization initiator, and γ) a hard coating composition C comprising:
- at least one epoxy compound which is neither a hydrolysis-polymerizable silicon compound nor a condensation compound thereof,
- at least one silicon compound having at least one hydrolyzable group directly linked to the silicon atom and at least one acryloxy or alkylacryloxy group, and/or a condensation compound thereof, and
- at least one cationic polymerization initiator, b) activating the at least one cationic polymerization initiator so as to bring the hard coating composition to a state in which it is partially polymerized, c) depositing onto the partially polymerized hard coating composition an anti-fouling top coat composition, d) submitting the article resulting from the preceding step to a heating step so as to completely cure the hard coating composition and the anti-fouling top coat composition, and e) recovering an article having a hard coat and an anti-fouling top coat deposited thereon and firmly adhering to it.

Contrary to what is specifically described in the above referred TDK Patent Application, there is, according to the invention, an effective curing (although not complete) of the deposited hard coating composition before deposition of the anti-fouling top coat (step b)).

Without being linked by a theory, the inventors think that the process of the invention avoids a too large penetration of the top coat liquid composition inside the hard coat, and consequently, the properties of the top coat are more respected.

During the heating of step d), both the hard coating composition and top coat composition are cured at the same time, which gives a good adhesion of both layers to each other.

It is particularly surprising that hard coating compositions containing a minor amount of alkoxysilane compounds and condensation compounds thereof (less than 5% by weight with respect to the weight of polymerizable compounds, i.e. the monomers) or even containing no alkoxysilane compound can provide, after curing, a good adhesion between the anti-fouling top coat and the substrate although document US 2005112365 requires the presence of a minimum amount of silane having hydrolysable groups in order to have a good adhesion.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION OF THE INVENTION AND PREFERRED EMBODIMENTS

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, reaction conditions, etc. used herein are to be understood as modified in all instances by the term "about."

Herein, the term "lens" means an organic or mineral glass lens, comprising a lens substrate which may be coated with one or more coatings of various natures.

When the optical article comprises one or more surface coatings, the term "to deposit a layer onto the optical article" means that a layer is deposited onto the outermost coating of the optical article.

The hard coating composition used in the present invention is selected from:

a hard coating composition A comprising:

at least one silicon compound having at least one hydrolyzable group directly linked to the silicon atom and at least one epoxy group, and/or a condensation compound thereof, and at least one cationic polymerization initiator, a hard coating composition B comprising:

at least one epoxy compound which is neither a hydrolysis-polymerizable silicon compound nor a condensation compound thereof, less than 5%, preferably less than 4.5%, more preferably less than 4% by weight of alkoxysilane compounds and condensation compounds thereof with respect to the weight of polymerizable compounds, and at least one cationic polymerization initiator, and a hard coating composition C comprising:

at least one epoxy compound which is neither a hydrolysis-polymerizable silicon compound nor a condensation compound thereof, at least one silicon compound having at least one hydrolyzable group directly linked to the silicon atom and at least one acryloxy or alkylacryloxy group, and/or a condensation compound thereof, and at least one cationic polymerization initiator.

In the present patent application, "silicon compounds having at least one hydrolyzable group directly linked to the silicon atom" and "hydrolysis-polymerizable silicon compounds" include silazane compounds.

The preferred silicon compounds having at least one hydrolyzable group directly linked to the silicon atom and at least one epoxy group usable in composition A according to the invention have three hydrolyzable groups directly linked to the silicon atom and one organic group comprising an epoxy group.

Said hydrolyzable groups may be chosen from alkoxy groups, halogen groups such as chlorine or bromine groups, alkenyloxy groups such as isopropenoxy group, acyloxy groups such as acetoxy or propionoxy groups, substituted or unsubstituted amino group and mixtures thereof. Preferred hydrolyzable groups are alkoxy groups, more preferably alkoxy groups having 1 to 4 carbon atoms, such as methoxy group, ethoxy group, and propoxy group.

Thus, the preferred silicon compounds having at least one hydrolyzable group directly linked to the silicon atom and at least one epoxy group usable in composition A according to the invention are alkoxysilanes having at least one epoxy group. They will be designated as epoxyalkoxysilanes.

The preferred alkoxysilanes which may be used in composition B in an amount of less than 5%, preferably less than 4.5%, more preferably less than 4% by weight with respect to the weight of polymerizable compounds are preferably alkoxysilanes having at least one epoxy group (epoxyalkoxysilanes) or condensation compounds thereof.

The preferred epoxyalkoxysilanes, used in composition A and usable in composition B comprise an epoxy group and three alkoxy groups, the latter groups being directly linked to a silicon atom. They will be designated also as epoxytrialkoxysilanes.

A preferred epoxyalkoxysilane can be an alkoxysilane bearing a β-(3,4-epoxycyclohexyl) group, such as β-(3,4-epoxycyclohexyl)ethyltrimethoxysilane.

Epoxyalkoxysilanes particularly preferred have the formula (I):

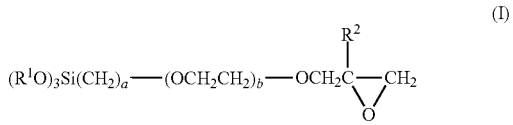

wherein:
$R^1$ is an alkyl group of 1 to 6 carbon atoms, preferably a methyl group or ethyl group,
$R^2$ is a methyl group or a hydrogen atom,
a is an integer from 1 to 6,
b is representing 0, 1 or 2.

Examples of such epoxyalkoxysilanes are γ-glycidoxypropyl-triethoxysilane or γ-glycidoxypropyltrimethoxysilane. One preferably uses γ-glycidoxypropyltrimethoxysilane (GLYMO).

As epoxyalkoxysilanes, one can also use epoxydialkoxysilanes such as γ-glycidoxypropylmethyldimethoxysilane, γ-glycidoxypropylmethyldiethoxysilane and γ-glycidoxyethoxypropylmethyldimethoxysilane.

Other examples of epoxyalkoxysilanes or epoxysilanes having at least one hydrolyzable group directly linked to the silicon atom are γ-glycidoxypropyl-pentamethyldisiloxane, γ-glycidoxypropyl-methyl-diisopropenoxysilane, γ-glycidoxypropyl-dimethyl-ethoxysilane, γ-glycidoxypropyl-diisopropyl-ethoxysilane and γ-glycidoxypropyl-bis(trimethylsiloxy)methylsilane.

The silicon compounds may be under a hydrolyzed form, but preferably, they are not hydrolyzed. The hydrolysis may be performed as known in the art, by using acidic catalysts (hydrochloric acid, acetic acid), in the presence of water.

The amount of silicon compounds having at least one hydrolyzable group directly linked to the silicon atom and at least one epoxy group and condensation compounds thereof in the hard coating composition A preferably ranges from 5 to 100%, more preferably from 5 to 80%, even more preferably from 25 to 80% by weight relative to the total weight of polymerizable compounds and solid fillers (if present) contained in said composition.

According to one embodiment of the invention, the hard coating composition is composition B and comprises less than 5%, preferably less than 4.5%, more preferably less than 4% by weight of hydrolysis-polymerizable silicon compounds and condensation compounds thereof, with respect to the weight of polymerizable compounds.

According to another embodiment of the invention, the hard coating composition is composition B and comprises less than 5%, preferably less than 4.5%, more preferably less than 4% by weight of silicon compounds, with respect to the weight of polymerizable compounds.

According to a further embodiment of the invention, the hard coating composition is composition B and comprises no alkoxysilane compound.

According to still a further embodiment of the invention, the hard coating composition is composition B and comprises no silicon compound.

The epoxy compounds which are neither hydrolysis-polymerizable silicon compounds nor condensation compounds thereof usable in composition B or C according to the invention will be referred to as "epoxy compounds." This means that such epoxy compounds are not, for example, alkoxysilane compounds or hydrolyzates thereof.

They are preferably compounds comprising at least two epoxy groups. Specific examples of compounds having epoxy groups include bisphenol A diglycidylether, novolac-type epoxy resins, trisphenol methane triglycidylether, 1,4-butanediol diglycidylether, 1,6-hexanediol diglycidylether, glycerin triglycidylether, trimethylolpropane triglycidylether, and propylene glycol diglycidylether.

Specific examples of compounds having alicyclic epoxy groups usable in composition B or C include 2,4-epoxycyclohexylmethyl-3,4-epoxycyclohexanecarboxylate, bis(3,4-epoxycyclohexylmethyl)adipate, 2-(3,4-epoxycyclohexyl-5,5-spiro-3,4-epoxy)cyclohexanone-meta-dioxane, bis(2,3-epoxycyclopentyl)ether, and EHPE-3150 (alicyclic epoxy resin, manufactured by DAICEL CHEMICAL INDUSTRIES, LTD.), bisphenol F epoxy (PY306, GY281 from Ciba-Geigy), epoxy phenol novolac (PY 307 from Ciba-Geigy), alicyclic diepoxy carboxylate (CY-179 from Ciba-Geigy), 3,4-epoxycyclohexylmethyl-3,4-epoxycyclohexyl carboxylate (Union Carbide CYRACURE UVR-6105 and UVR-6110), bis-(3,4-epoxycyclohexyl)adipate (Union Carbide UVR-6128), propylene glycol diglycidyl ether.

The amount of epoxy compounds in the hard coating compositions B or C preferably ranges from 30 to 100% by weight relative to the total weight of polymerizable compounds and solid fillers (if present) contained in said compositions.

In a particular embodiment of the invention, hard coating composition A may further comprise at least one epoxy compound which is neither a hydrolysis-polymerizable silicon compound nor a condensation compound thereof. Such compounds have been defined previously. When present in composition A, their amount preferably ranges from 15 to 80%, more preferably from 20 to 75% by weight relative to the total weight of polymerizable compounds and solid fillers (if present) contained in said composition.

The silicon compounds having at least one hydrolyzable group directly linked to the silicon atom and at least one acryloxy or alkylacryloxy group usable in composition C according to the invention preferably have two or three hydrolyzable groups directly linked to the silicon atom. The hydrolyzable groups directly linked to the silicon atom are such as defined previously. The alkylacryloxy group is a group represented by the formula $CH_2=C(R)COO-$, wherein R is an optionally substituted alkyl group, preferably an alkyl group having three or less carbon atoms. The preferred alkylacryloxy group is methacryloxy (R=methyl). The acryloxy group is a group represented by the formula $CH_2=C(H)COO-$.

Such compounds usable in composition C according to the invention preferably are alkoxysilane compounds having at least one acryloxy or alkylacryloxy group. They can be referred to as (alkyl)acryloxy alkoxysilane compounds, where (alkyl)acryloxy means acryloxy or alkylacryloxy. (Alkyl)acryloxy alkoxysilane compounds are preferably (alkyl)acryloxy alkyl alkoxysilane compounds, wherein both alkyl groups are independent from each other.

Specific examples of silicon compounds having at least one hydrolyzable group directly linked to the silicon atom and at least one acryloxy or alkylacryloxy group are as follows: γ-(meth)acryloxypropyltrimethoxysilane, γ-(meth)acryloxypropyltriethoxysilane, γ-(meth)acryloxypropylmethyldimethoxysilane, γ-(meth)acryloxypropylmethyldiethoxysilane, 3-(meth)acryloxypropylmethyldichlorosilane, β-(meth)acryloxyethyltrimethoxysilane, β-(meth)acryloxyethyltriethoxysilane, γ-(meth)acryloxypropyl-tris-(2-methoxyethoxy)silane, wherein (meth)acryloxy means acryloxy or methacryloxy.

The amount of silicon compounds having at least one hydrolyzable group directly linked to the silicon atom and at least one acryloxy or alkylacryloxy group and condensation compounds thereof in the hard coating composition C preferably ranges from 5 to 50%, more preferably from 5 to 35% and even more preferably from 5 to 15% by weight relative to the total weight of polymerizable compounds and solid fillers (if present) contained in said composition.

The hard coating composition according to the invention may further comprise at least one (meth)acrylate compound which is neither a hydrolysis-polymerizable silicon compound nor a condensation compound thereof, wherein (meth) acrylate refers to methacrylate or acrylate. This means that such (meth)acrylate compounds are not, for example, (meth) acryloxysilane compounds or hydrolyzates thereof.

The (meth)acrylate compounds can be chosen from monofunctional (meth)acrylates, multifunctional (meth)acrylates such as difunctional (meth)acrylates, trifunctional (meth)acrylates, tetrafunctional (meth)acrylates, pentafunctional (meth)acrylates, hexafunctional (meth)acrylates, and mixtures thereof.

Examples of such monomers are:
Monofunctional (meth)acrylates: Allyl methacrylate, 2-ethoxyethyl acrylate, 2-ethoxyethyl methacrylate, caprolactone acrylate, isobornyl methacrylate, lauryl methacrylate, polypropylene glycol monomethacrylate.
Difunctional (meth)acrylates: 1,4-butanediol diacrylate, 1,6-hexanediol diacrylate, 1,6-hexanediol dimethacrylate, polyethylene glycol diacrylate, tetraethylene glycol diacrylate, polyethylene glycol dimethacrylate, polyethylene glycol diacrylate, ethoxylated bisphenol A diacrylate, tetraethylene glycol diacrylate, tripropylene glycol diacrylate, neopentyl glycol diacrylate, 1,4-butanediol dimethacrylate, tetraethylene glycol dimethacrylate, diethylene glycol diacrylate.
Trifunctional (meth)acrylates: trimethylolpropane trimethacrylate, trimethylolpropane triacrylate, pentaerythritol triacrylate, ethoxylated trimethylolpropane triacrylate, trimethylolpropane trimethacrylate.
Tetra to hexa (meth)acrylates: Dipentaerythritol pentaacrylate, pentaerythritol tetraacrylate, ethoxylated pentaerythritol tetraacrylate, pentaacrylate esters.

The amount of such (meth)acrylate monomers in the hard coating composition preferably ranges from 0 to 70%, more preferably from 10 to 60% by weight relative to the total weight of polymerizable compounds and solid fillers (if present) contained in the hard coating composition.

In a particular embodiment of the invention, the hard coating composition comprises one or more (meth)acrylate compounds and at least one epoxy compound which is neither a hydrolysis-polymerizable silicon compound nor a condensation compound thereof, i.e. at least one (meth)acrylate compound and at least one "epoxy compound" such as described previously. When both categories of compounds are present in the hard coating composition, the weight ratio of epoxy compounds/(meth)acrylate compounds which are neither a hydrolysis-polymerizable silicon compound nor a condensation compound thereof preferably ranges from 0.4 to 1.5, more preferably from 0.5 to 1.0. A too high ratio may decrease abrasion and/or scratch resistance, while a too low ratio may compromise adhesion of the anti-fouling top coat.

In another particular embodiment of the invention, the hard coating composition is composition A, wherein composition A does not comprise any acrylic polymerizable compound, i.e. a polymerizable compound comprising at least one substituted or unsubstituted acrylic group.

The hard coating composition according to the invention comprises at least one cationic polymerization initiator, preferably at least one cationic photoinitiator.

Examples of cationic photoinitiators include onium salts, such as diazonium salts, sulfonium salts, and iodonium salts. Aromatic onium salts are particularly preferred. Also preferred are iron-arene complexes such as ferrocene derivatives, arylsilanol-aluminum complexes and the like.

Example of commercially available cationic photoinitiators are CYRACURE UVI-6970, CYRACURE UVI-6976, and CYRACURE UVI-6992 (each manufactured by Dow Chemical, USA), IRGACURE 264 (manufactured by Ciba Specialty Chemicals Inc.), and CIT-1682 (manufactured by Nippon Soda).

The amount of the cationic photoinitiator in the hard coating composition (as solid component) usually ranges from about 0.01 to about 15% by weight, preferably from 5 to 15% by weight relative to the total weight of polymerizable compounds comprising an epoxy group in said composition.

In addition to cationic polymerization initiators, the hard coating composition can also comprise one or more radical polymerization initiators, preferably one or more radical photoinitiators.

Examples of such radical photoinitiators include DAROCURE 1173, IRGACURE 184, IRGACURE 500, IRGACURE 651, IRGACURE 819 and IRGACURE 907 (each manufactured by Ciba Specialty Chemicals Inc.). The amount of the radical photoinitiator in the hard coating composition (as solid component) ranges for example from about 0.5 to about 5% by weight relative to the total weight of ethylenically unsaturated polymerizable compounds in said composition.

The hard coating composition according to the invention may further comprise solid fillers, preferably inorganic fillers. Suitable inorganic fillers are for example nanoparticles of aluminum oxide $Al_2O_3$, silicon oxide SiO or $SiO_2$, zirconium oxide $ZrO_2$, titanium oxide $TiO_2$, antimony oxide, tantalum oxide $Ta_2O_5$, zinc oxide, tin oxide, indium oxide, cerium oxide, $Si_3N_4$, $MgF_2$ or their mixtures. It is also possible to use particles of mixed oxides. As used herein, the term "nanoparticles" is intended to mean solid particles having an average particle size higher than or equal to 1 nm but inferior to 1 μm.

According to the process of the invention, the hard coating composition is applied onto the lens substrate and cured to a state where it is not fully reacted, i.e. partially polymerized (partially cured state).

This encompasses the embodiment wherein the coating is only gelled and is still tacky to the touch and the embodiment wherein the coating has been cured and is no more tacky but its curing can be further improved.

The partial polymerization of step b) is preferably made by polymerizing the hard coating composition in an oxygen comprising gas which partially inhibits polymerization.

Preferably, the oxygen comprising gas is air.

During step b), the cationic polymerization initiator is activated according to techniques known in the art.

Preferably the cationic polymerization initiator used for achieving the partial polymerization step b) is photoactivated (activation made by irradiation), preferably under UV irradiation.

Typically, the energy that is applied to the hard coating for achieving the partial polymerization ranges from 1 to 3 Joules/cm$^2$ in the UV A range; from 1 to 5 Joules/cm$^2$ in the UV B range and from 0.1 to 1, preferably 0.15 to 0.5 J/cm$^2$ in the UV C range.

The irradiation is typically applied during a time ranging from 15 seconds to 44 seconds.

In a subsequent step, an anti-fouling top coat is applied onto the partially polymerized hard coat.

The anti-fouling top coat used herein is intended to improve dirty mark resistance of the finished optical article.

Once the hard coating composition has been partially polymerized in the conditions described above, then the substrate with the hard coating and the anti-fouling top coat deposited over it are further cured at the same time by heating (step d)). The heating step may typically last from 30 minutes to several hours, typically 2 hours.

If necessary, a curing step, such as an irradiation step, may be performed after step c) or after step d) in addition to heat-curing step d) to completely polymerize the cationic polymerizable compounds which have been partially polymerized during step b). However, the inventive process does preferably not comprise such an additional curing step.

As known in the art, an anti-fouling top coat is a layer wherein the stationary contact angle to deionized water is at least 75°, preferably at least 90°, and more preferably more than 100°. The stationary contact angle is determined according to the liquid drop method in which a water drop having a diameter smaller than 2 mm is formed on the optical article and the contact angle is measured. It corresponds to the angle at which the surface of the water drop meets the surface of the optical article.

The anti-fouling top coats preferably used in this invention are those which reduce surface energy of the optical article to less than 14 mJ/m². The invention has a particular interest when using anti-fouling top coats having a surface energy of less than 13 mJ/m² and even better less than 12 mJ/m².

The surface energy values referred above are calculated according to Owens Wendt method described in the following document: Owens, D. K.; Wendt, R. G. "Estimation of the surface force energy of polymers", J. Appl. Polym. Sci. 1969, 51, 1741-1747.

The anti-fouling top coat according to the invention is preferably of organic nature. By organic nature, it is meant a layer which is comprised of at least 40% by weight, preferably at least 50% by weight of organic materials, relative to the total weight of the coating layer.

A preferred anti-fouling top coat is a hydrophobic and/or oleophobic surface coating, and more preferably an anti-fouling top coat made from a liquid coating material comprising at least one fluorinated compound Hydrophobic and/or oleophobic surface coatings most often comprise one or more silane-based compounds bearing fluorinated groups (fluorosilanes), in particular perfluorocarbon or perfluoropolyether group(s). By way of example, silazane, polysilazane or silicone compounds are to be mentioned, comprising one or more fluorine-containing groups such as those mentioned here above. Such compounds have been widely disclosed in the previous art, for example in U.S. Pat. No. 4,410,563, EP 0203730, EP 749021, EP 844265 and EP 933377.

A known method to form an anti-fouling top coat consists in depositing, on the hard coating, compounds bearing fluorinated groups and Si—R groups, R representing an —OH group or a precursor thereof, such as —Cl, —NH$_2$, —NH— or —O-alkyl, preferably an alkoxy group. Such compounds may perform, at the hard coating surface, directly or after hydrolysis, polymerization and/or cross-linking reactions with pendent reactive groups.

Preferred fluorinated compounds are silanes and silazanes bearing at least one group selected from fluorinated hydrocarbons, perfluorocarbons, fluorinated polyethers such as F$_3$C—(OC$_3$F$_6$)$_{24}$—O—(CF$_2$)$_2$—(CH$_2$)$_2$—O—CH$_2$—Si (OCH$_3$)$_3$ and perfluoropolyethers, in particular perfluoropolyethers groups.

Among fluorosilanes there may be cited the compounds of formulae:

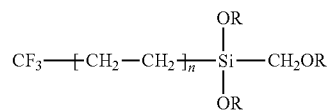

wherein n=5, 7, 9 or 11 and R is an alkyl group, typically a C$_1$-C$_{10}$ alkyl group such as methyl, ethyl and propyl;

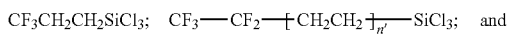

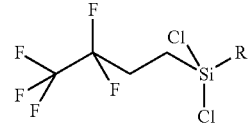

wherein n'=7 or 9 and R is as defined above.

Compositions containing fluorinated compounds also useful for making hydrophobic and/or oleophobic top coats are disclosed in U.S. Pat. No. 6,183,872. The silicon-containing organic fluoropolymer of U.S. Pat. No. 6,183,872 is represented by the below general formula and has a number average molecular weight of from 5×10² to 1×10⁵ g/mol.

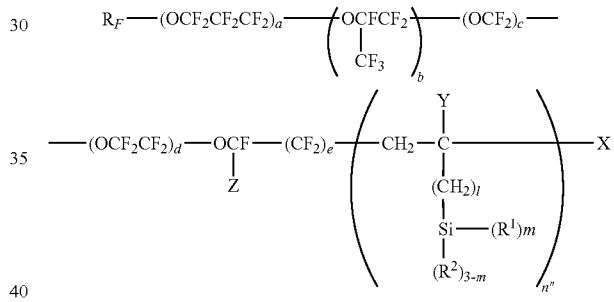

wherein R$_F$ represents a perfluoroalkyl group, Z represents a fluorine atom or a trifluoromethyl group, a, b, c, d and e each independently represent 0 or an integer equal to or higher than 1, provided that a+b+c+d+e is not less than 1 and the order of the repeating units parenthesized by subscripts a, b, c, d and e occurring in the above formula is not limited to that shown; Y represents a hydrogen atom or an alkyl group containing 1 to 4 carbon atoms; X represents a hydrogen, bromine or iodine atom; R$^1$ represents a hydroxyl group or a hydrolyzable substituent group; R$^2$ represents a hydrogen atom or a monovalent hydrocarbon group; l represents 0, 1 or 2; m represents 1, 2 or 3; and n" represents an integer equal to or higher than 1, preferably equal to or higher than 2.

Other preferred compositions for forming the hydrophobic and/or oleophobic surface coating are those containing compounds comprising fluorinated polyether groups, in particular perfluoropolyether groups. A particular preferred class of compositions containing fluorinated polyether groups is disclosed in U.S. Pat. No. 6,277,485. The anti-fouling top coats of U.S. Pat. No. 6,277,485 are at least partially cured coatings comprising a fluorinated siloxane prepared by applying a coating composition (typically in the form of a solution) comprising at least one fluorinated silane of the following formula:

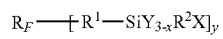

wherein $R_F$ is a monovalent or divalent fluorinated polyether group, $R^1$ is a divalent alkylene group, arylene group, or combinations thereof, optionally containing one or more heteroatoms or functional groups and optionally substituted with halide atoms, and preferably containing 2 to 16 carbon atoms; $R^2$ is a lower alkyl group (i.e., a $C_1$-$C_4$ alkyl group); Y is a halide atom, a lower alkoxy group (i.e., a $C_1$-$C_4$ alkoxy group, preferably, a methoxy or ethoxy group), or a lower acyloxy group (i.e., —OC(O)$R^3$ wherein $R^3$ is a $C_1$-$C_4$ alkyl group); x is 0 or 1; and y is 1 ($R_F$ is monovalent) or 2 ($R_F$ is divalent). Suitable compounds typically have a molecular weight (number average) of at least about 1000. Preferably, Y is a lower alkoxy group and $R_F$ is a fluorinated polyether group.

Commercial compositions for making anti-fouling top coats are the compositions KY130 and KP 801M commercialized by Shin-Etsu Chemical and the composition OPTOOL DSX® (a fluorine-based resin comprising perfluoropropylene moieties) commercialized by Daikin Industries. OPTOOL DSX® is the most preferred coating material for anti-fouling top coats.

The liquid coating material for forming the anti-fouling top coat of the invention, generally referred to as "the liquid coating material", may comprise one or more of the above cited compounds. Preferably, such compounds or mixtures of compounds are liquid or can be rendered liquid by heating, thus being in a suitable state for evaporation. Such liquid coating material is applied onto the hard coating composition, once it has been partially cured.

The anti-fouling top coat may be applied on the hard coating by any method known in the art.

Preferable methods are dip coating, spin coating. Spray coating, brush coating and flow coating can be also used.

The thickness of the top coat is generally less than 100 nm; preferably it ranges from 2 to 50 nm, better 2 to 10 nm and even better 2 to 5 nm.

The thickness of the hard coat preferably ranges from 3 to 15 μm.

The substrate on which the hard coat and anti-fouling top coat are deposited in this order may be made of mineral glass or organic glass, preferably organic glass. The organic glass substrate can be made of any material currently used for organic ophthalmic lenses, e.g., either thermoplastic materials such as thermoplastic polycarbonates and polyurethanes, or thermosetting (cross-linked) materials, such as: those obtained by polymerization of allyl derivatives such as the allyl carbonates of linear or branched aliphatic or aromatic polyols, such as ethylene glycol bis(allyl carbonate), diethylene glycol bis(2-methyl carbonate), diethylene glycol bis(allyl carbonate), ethylene glycol bis(2-chloroallyl carbonate), triethylene glycol bis(allyl carbonate), 1,3-propanediol bis(allyl carbonate), propylene glycol bis(2-ethylallyl carbonate), 1,3-butenediol bis(allyl carbonate), 1,4-butenediol bis(2-bromoallyl carbonate), dipropylene glycol bis(allyl carbonate), trimethylene glycol bis(2-ethylallyl carbonate), pentamethylene glycol bis(allyl carbonate), isopropylene bisphenol A bis(allyl carbonate), poly(meth)acrylates and copolymers based substrates, such as substrates obtained by the polymerization of alkyl methacrylates, in particular $C_1$-$C_4$ alkyl methacrylates such as methyl(meth)acrylate and ethyl (meth)acrylate, substrates comprising (meth)acrylic polymers and copolymers derived from bisphenol-A, polyethoxylated aromatic (meth)acrylates such as the polyethoxylated bisphenolate di(meth)acrylates, polythio(meth)acrylates, thermosetting polyurethanes, polythiourethanes, polyepoxides, polyepisulfides, as well as copolymers thereof and blends thereof. By (meth)acrylate, it is meant a methacrylate or an acrylate.

The substrates particularly recommended are substrates obtained by polymerization or copolymerization of diethylene glycol bis(allyl carbonate), sold under the trade name CR-39@ by PPG INDUSTRIES (ORMA® ESSILOR lens) and substrates made of PC (polycarbonate) (AIRWEAR™ Essilor lenses).

Among other recommended substrates are substrates obtained by polymerization of thio(meth)acrylic monomers, such as those disclosed in the French patent application FR 2734827 and substrates made of polythiourethane materials.

The substrates may obviously be obtained by polymerizing mixtures of the above monomers.

The hard coating may be applied directly on the naked surface of the substrate, either pretreated or not or on a surface that has previously been coated with a functional coating, such as an impact resistant primer coating, the thickness of which generally ranges from 0.5 to 3 μm, preferably 0.8 to 1.2 μm.

Such impact primer resistant coatings are known in the art and disclosed for example in EP1651986 incorporated herein by reference.

The invention can be used for imparting anti-fouling properties to either the front or back face or both of articles, such as optical lenses or ophthalmic lenses.

In the case of a lens, the rear (back) face (generally the concave face) of the substrate is the face of the lens substrate which, in use, is the closest to the wearer's eye. The front face (generally the convex face) of the lens substrate is the face of the lens substrate which, in use, is the farthest from the wearer's eye.

It can also be used for imparting hardness and anti-fouling properties by spin coating the back side of a lens while the other side (front face) has been already treated, for example by evaporation deposition of an anti-reflection stack.

The invention has a lot of advantages.

The top coat can be applied in a liquid form.

The process is simple and does not need any pre-treatment, or activation treatment step of the surface of the applied hard coating composition (such as corona, plasma) before depositing the anti-fouling top coat composition, which is an advantage over the prior art processes.

However such an activation treatment may be used if it is needed for further enhancing the good adhesion already obtained by the invention.

The process preserves the surface properties of the top coat and the articles obtained by the process of the invention have generally higher contact angles than the articles of the prior art.

The invention also relates to a coated article having a substrate coated with a hard coat and, deposited thereon, an anti-fouling top coat having a static contact angle with water of 111° or more and a thickness of 2-50 nm, wherein the coated article is either obtainable or obtained by the above described process. Said static contact angle with water is preferably higher than or equal to any one of the following values: 112°, 113°, 114° and 115°.

The invention is further illustrated by the examples described below. These examples are meant to illustrate the invention and are not to be interpreted as limiting the scope of the invention.

EXAMPLES

Example 1 (Composition B)

A hard coating composition comprising bisphenol A epoxy, di- and tri-functional glycidyl ethers, with di- and hexa-functional acrylates is a UV curable formulation that exhibits good adhesion to classical optical organic material CR-39®, acrylic polymer (refractive index: 1.54), polythiourethane (1.60), and (1.67) lens substrates.

| Components | % weight/weight |
|---|---|
| Elastomer modified Bisphenol A diepoxy | 6.51 |
| Trimethylol propane triglycidyl ether | 21.31 |
| 1,4-butanediol diglycidyl ether | 11.71 |
| Dipentaerythritol hexaacrylate | 22.10 |
| 1,6-hexanediol diacrylate | 26.06 |
| Hexafluoroantimonate salts | 6.86 |
| Triarylsulfonium Hexafluorophosphate salts | 2.33 |
| 2-hydroxy-2-methyl-1-phenyl-propan-1-one | 1.64 |
| Phenylbis(2,4,6-trimethylbenzoyl)-phosphine oxide | 0.41 |
| Fluorocarbon modified polysiloxane surfactant | 0.42 |
| Acrylated silicone | 0.65 |

The coating composition was prepared as follows:

1. 6.51 grams of an elastomer modified bisphenol A diepoxy (Hypox RA-1340) were added to an amber Nalgene® bottle.
2. Next, 11.71 grams of 1,4-butanediol diglycidyl ether were added to the bottle and the mixture was mildly heated by placing the bottom portion of the sealed bottle in hot water for 15 minutes. The warm mixture was stirred for 10 minutes.
3. 21.31 grams of trimethylol propane triglycidyl ether were then added to the stirring mixture.
4. 26.06 grams of 1,6-hexanediol diacrylate were then added to the mixture.
5. 22.10 grams of dipentaerythritol pentaacrylate were then added to the mixture.
6. 6.86 grams of hexafluoroantimonate salts photoinitiator were then added.
7. 2.33 grams of triarylsulfonium hexafluorophosphate salts photoinitiator were then added.
8. 1.64 gram of 2-hydroxy-2-methyl-1-phenyl-propan-1-one photoinitiator was then added.
9. 0.41 g of phenylbis(2,4,6-trimeethylbenzoyl)-phosphine oxide photoinitiator was then added.
10. 0.42 g of fluorocarbon modified polysiloxane surfactant was then added.
11. Finally, 0.65 grams of acrylated silicone was added and the amber Nalgene® bottle was sealed.
12. The bottle was again placed into warm water to indirectly heat the coating mixture for a period of 45 minutes.
13. The coating composition was allowed to stir for 16 hours to insure proper mixing.

The coating was applied to the convex side of five polycarbonate lenses by spin coating (Application spin speed: 1500 rpm; Spin off speed: 2300 rpm).

The coating was partially UV cured using a Fusion Systems H+ bulb. The UV dosage is outlined in Table 1 below:

TABLE 1

| | UV-A | UV-B | UV-C | UV-V |
|---|---|---|---|---|
| Energy | 1.342 W/cm$^2$ | 1.307 W/cm$^2$ | 0.204 W/cm$^2$ | 0.741 W/cm$^2$ |
| Power | 1.726 J/cm$^2$ | 2.616 J/cm$^2$ | 0.297 J/cm$^2$ | 0.927 J/cm$^2$ |

Next, the coated lenses were treated with a fluorinated top coat Optool (DSX®) solution by dip coating.

The anti-fouling top coat composition was prepared as follows:

8.50 grams of Optool DSX® were added to 1700 grams of perfluorohexane sold under the trade name Demnum by DAIKIN Industries, Ltd. The hard coated lenses were dipped into this solution using a withdrawal speed of 22 mm/second to apply the anti-fouling layer.

No surface pre-treatment was used before depositing the anti-fouling top coat composition.

The lenses were then cured by heating in an oven for approximately one hour at 80° C. Alternatively, the lenses can be cured by infrared radiation using a Lesco EZ-IR Cure System set at 371° C. and using a 30 second cycle time.

The measured thickness of the anti-fouling top coat by ellipsometry was 4.627 nm±0.144 nm.

Example 2 (Composition B)

The hard coating composition of this example comprises di- and tri-functional glycidyl ethers with cationic photoinitiators, and is a UV curable coating.

The components of the composition are listed hereafter.

| Components | % weight/weight |
|---|---|
| Trimethylol propane triglycidyl ether | 45.4 |
| 1,4-butanediol diglycidyl ether | 45.4 |
| Photoinitiator UVI 6976 | 9.1 |
| Surfactant | 0.1 |

Preparation of the coating composition:

1. 45.4 grams of trimethylol propane triglycidyl ether were poured in a beaker.
2. 45.4 grams 1,4-butanediol diglycidyl ether were added to beaker while mixing. Mixing was maintained for 30 minutes.
3. 9.1 grams photoinitiator were added while mixing the blend for 30 minutes.
4. Further, 0.1 g surfactant was added. The blend was then mixed for 30 minutes.

The obtained coating composition was spin coated onto a polycarbonate lens for 10 seconds at 1200 rpm and partially cured via Lesco system H+ UV bulb for 30 seconds, as described in example 1.

Next, the coated lens was treated with a fluorinated top coating Optool (DSX®) solution by dip coating as described in example 1.

Subsequently, the treated lens was cured for 1 hour at 80° C. as described in example 1.

Example 3 (Composition A)

The following composition comprising 3-glycidoxypropyltrimethoxysilane was added to the above epoxy coating.

| Components | % weight/weight |
| --- | --- |
| Trimethylol propane triglycidyl ether | 36.3 |
| 1,4-butanediol diglycidyl ether | 36.3 |
| 3-glycidoxypropyltrimethoxysilane | 18.2 |
| Photoinitiator UVI 6976 | 9.1 |
| Surfactant | 0.1 |

Preparation of the coating composition:

1. 36.3 grams of trimethylol propane triglycidyl ether were poured in a beaker.
2. 36.3 grams 1,4-butanediol diglycidyl ether were added to beaker while mixing and were mixed for 30 minutes.
3. 18.2 grams 3-glycidoxypropyltrimethoxysilane were added and mixed for 30 minutes.
4. 9.1 grams photoinitiator were added while mixing for 30 minutes.
5. 0.1 g surfactant was added and the resulting blend was mixed for 30 minutes.

The coating composition was spin coated onto a polycarbonate lens for 10 seconds at 1200 rpm and partially cured via Lesco system H+ UV bulb for 30 seconds.

Next, the coated lens was treated with a fluorinated top coating Optool (DSX®) solution by dip coating as described in example 1.

Subsequently, the treated lens was cured for 1 hour at 80° C. as described in example 1.

Example 4 (Composition A)

The following composition using an epoxysilane with colloidal silica was used as cationic curable coating composition:

| Components | % weight/weight |
| --- | --- |
| 3-glycidoxypropyltrimethoxysilane | 62.4 |
| Colloidal silica (30% w/w) in methanol | 31.3 |
| Photoinitiator UVI 6976 | 6.2 |
| Surfactant | 0.1 |

Preparation of the coating composition:

1. 62.4 grams of 3-glycidoxypropyltrimethoxysilane were poured in a beaker.
2. then 31.3 grams of colloidal silica (30%) in methanol were added. The resulting blend was mixed for 30 minutes.
3. 6.2 grams of photoinitiator UVI 6976 were added while mixing, for 30 minutes.
4. then 0.1 g surfactant was added and the blend was mixed for 30 minutes.

Coating was spin coated onto a CR-39® lens for 10 seconds at 1200 rpm and partially cured via Lesco system H+ UV bulb for 30 seconds.

Next, the coated lens was treated with a fluorinated top coati Optool (DSX®) solution by dip coating as described in example 1.

Subsequently, the treated lens was cured for 1 hour at 80° C. as described in example 1.

Example 5 (Composition A)

Epoxy silane with acrylated colloidal silica was used as cationic curable coating:

| Components | % weight/weight |
| --- | --- |
| 3-glycidoxypropyltrimethoxysilane | 62.4 |
| Acrylated colloidal silica | 31.3 |
| Photoinitiator Irgacure 500 | 1.0 |
| Photoinitiator UVI 6976 | 5.2 |
| Surfactant | 0.1 |

Preparation of the coating composition:

1. 62.4 grams of 3-glycidoxypropyltrimethoxysilane were poured in a beaker.
2. then 31.3 grams of acrylated colloidal silica were added and the resulting blend was mixed for 30 minutes.
3. 5.2 grams of cationic photoinitiator and 1.0 grams free radical photoinitiator were added while mixing, for 30 minutes.
4. Finally 0.1 g surfactant was added and the blend was mixed for 30 minutes.

The coating composition was spin coated onto a polycarbonate lens for 10 seconds at 1200 rpm and partially cured via Lesco system H+ UV bulb for 30 seconds.

Next, the coated lens was treated with a fluorinated top coating Optool (DSX®) solution by dip coating as described in example 1.

Subsequently, the treated lens was cured for 1 hour at 80° C. as described in example 1.

Example 6 (Composition A)

Coating composition containing epoxy and acrylic compounds and an epoxysilane compound.

| Components | % weight/weight |
| --- | --- |
| Trimethylol propane triglycidyl ether | 18.1 |
| Triglycidylether of castor oil | 4.3 |
| 1,4-butanediol diglycidyl ether | 14.5 |
| Diethylene glycol diacrylate | 30.7 |
| Dipentaerythritol hexaacrylate | 21.7 |
| Pre-hydrolyzed 3-glycidoxypropyltrimethoxysilane | 9.0 |
| Hexafluoroantimonate salts | 1.1 |
| Benzophenone (50%)/1-Hydroxycyclohexyl Phenyl Ketone (50%) | 0.50 |
| Polyalkyleneoxide modified heptamethyltrisiloxane allyloxypolyethyleneglycol | 0.14 |

Preparation of the coating composition:

1. 3-glycidoxypropyltrimethoxysilane was hydrolyzed with at least a stoichiometric amount of 0.1 normal hydrochloric acid and was allowed to mix for 30 minutes.
2. 18.1 parts of trimethylol propane triglycidyl ether were added to an amber Nalgene® bottle.
3. Next, 4.3 parts of triglycidylether of castor oil were added.
4. 14.5 parts of 1,4-butanediol diglycidyl ether were then added.
5. 30.7 parts of diethylene glycol diacrylate were then added.
6. 21.7 parts of dipentaerythritol hexaacrylate were then added.
7. 9.0 parts of the prehydrolyzed Glymo from step 1 were then added.
8. 1.1 part of hexafluoroantimonate salts cationic photoinitiator was then added.

9. 0.5 part of benzophenone (50%)/1-Hydroxycyclohexyl Phenyl Ketone (50%) free radical photoinitiator was then added.

10. Finally, 0.14 part polyalkyleneoxide Modified Heptamethyltrisiloxane Allyloxypolyethyleneglycol surfactant was added and the mixture was allowed to stir for 16 hours to insure proper mixing.

The coating composition was applied to lenses of various substrates (polycarbonate, CR-39®, polyurethane (refractive index: 1.60 and 1.67) by spin coating for evaluation (Application spin speed: 1000 rpm, spin off speed: 1500 rpm).

The coating was partially UV-cured using a Fusion Systems H+ bulb and a belt conveyor speed of 4.5 ft./min for 30 seconds, such as described in example 1.

Next, the coated lenses were treated with a fluorinated top coating Optool (DSX®) solution by dip coating as described in example 1.

Subsequently, the treated lenses were cured for 1 hour at 80° C. as described in example 1.

Results:

The following water contact angle values were obtained, revealing chemical adhesion of the anti-fouling top coat even after solvent wash or basic hydrolysis:

| Example | Initial water contact angle (°) | Water contact angle after solvent wash (t = 60 min) (°) | Water contact angle after basic hydrolysis (t = 30 min) (°) |
| --- | --- | --- | --- |
| 1 | 112.44 | 112.44 | 114.02 |
| 2 | 114.66 | 114.29 | 114.37 |
| 3 | 115.48 | 114.12 | 116.00 |
| 4 | 115.81 | 115.25 | 113.93 |
| 5 | 110.54 | 110.95 | 113.47 |

The procedure for solvent wash test was as follows:
1/Wash the lens with soap and water.
2/Air dry the lens.
3/Measure contact angle using 3 to 5 drops of water.
4/Place the lenses in perfluorohexane (Demnum).
5/After 30 min remove and dry the lens.
6/repeat step 3.
7/repeat step 4, 5, and 3.

The procedure for basic hydrolysis test was as follows:
The lenses were dipped in 0.1N NaOH for 1 min and then for anther 29 min. Water contact angle was measured at t=0, 1, 30 min.

Example 7 (Composition B)

| Components | % weight/weight |
| --- | --- |
| Trimethylol propane triglycidyl ether | 14.63 |
| 1,4-butanediol diglycidyl ether | 26.15 |
| Dipentaerythritol hexaacrylate | 11.16 |
| 1,6-hexanediol diacrylate | 35.58 |
| Hexafluoroantimonate salts | 6.99 |
| Triarylsulfonium hexafluorophosphate salts | 2.38 |
| 2-hydroxy-2-methyl-1-phenyl-propan-1-one | 1.61 |
| Phenylbis(2,4,6-trimethylbenzoyl)-phosphine oxide | 0.40 |
| Fluorocarbon modified polysiloxane surfactant | 0.10 |

The coating composition was prepared as follows:

1. 14.63 grams of trimethylol propane triglycidyl ether were added to an amber Nalgene® bottle.
2. Next, 26.15 grams of 1,4-butanediol diglycidyl ether were added.
3. 11.16 grams of dipentaerythritol hexaacrylate were then added to the mixture.
4. 35.58 grams of 1,6-hexanediol diacrylate were then added to the mixture.
5. 6.99 grams of hexafluoroantimonate salts (photoinitiator) were then added.
6. 2.38 grams of triarylsulfonium hexafluorophosphate salts (photoinitiator) were then added.
7. 1.61 g of 2-hydroxy-2-methyl-1-phenyl-propan-1-one (photoinitiator) was then added.
8. 0.40 g of phenylbis(2,4,6-trimethylbenzoyl)-phosphine oxide (photoinitiator) was then added.
9. 0.10 g of fluorocarbon modified polysiloxane surfactant was then added.
10. The bottle was then placed into warm water to indirectly heat the coating mixture for a period of 45 minutes.
11. The coating composition was allowed to stir for 16 hours to ensure proper mixing.

The coating was applied to the convex side of five polycarbonate lenses by spin coating (Application spin speed: 1000 rpm; Spin off speed: 1300 rpm).

The coating was partially UV-cured using a Fusion Systems H+ bulb. The UV dosage is outlined in Table 1 above.

Next, the coated lenses were treated with a fluorinated top coating Optool (DSX®) solution by dip coating as described in example 1, except that the lenses were first treated with corona before deposition of the anti-fouling top coat and that step d) was performed by infrared curing the lenses for 60 seconds. The detailed process is as follows:

1) Corona Treatment of the Hard Coated Lens
The following steps were implemented:
One corona pass at 6 mm/s using a 3DT Corona equipment;
Waiting time for 10 s prior to dip-coating step;
Dip in top-coat solution with a withdrawal speed of 22 mm/s;

2) Heat-Curing of the Top-Coat
The heat-curing step d) was performed in an IR oven regulated in order for the lenses to reach a temperature of 60 to 70° C. when they get out of the heat-curing process.

The following steps were implemented:
The lenses were cured in an IR oven for 60 s at 150° C.;
The lenses were removed from machine and lens holder;
After five minutes, the lenses were wiped with a cloth and a cleaning solution commonly found in optician shops and tested for top coat durability.

Example 8 (Composition C)

| Components | % weight/weight |
| --- | --- |
| Acryloxypropyltrimethoxysilane | 9.39 |
| Trimethylol propane triglycidyl ether | 21.13 |
| 1,4-butanediol diglycidyl ether | 16.44 |
| Dipentaerythritol hexaacrylate | 7.04 |
| 1,6-hexanediol diacrylate | 35.22 |
| Hexafluoroantimonate salts | 6.50 |
| Triarylsulfonium hexafluorophosphate salts | 2.21 |
| 2-hydroxy-2-methyl-1-phenyl-propan-1-one | 1.60 |
| Phenylbis(2,4,6-trimethylbenzoyl)-phosphine oxide | 0.40 |
| Fluorocarbon modified polysiloxane surfactant | 0.07 |

The coating composition was prepared as follows:

1. 9.39 grams of acryloxypropyltrimethoxysilane were added to an amber Nalgene® bottle.

2. Next, 21.13 grams of trimethylol propane triglycidyl ether were added.

3. 16.44 grams of 1,4-butanediol diglycidyl ether were then added to the mixture.

4. 7.04 grams of dipentaerythritol hexaacrylate were then added to the mixture.

5. 35.22 grams of 1,6-hexanediol diacrylate were then added to the mixture.

6. 6.50 grams of hexafluoroantimonate salts (photoinitiator) were then added.

7. 2.21 grams of triarylsulfonium hexafluorophosphate salts (photoinitiator) were then added.

8. 1.60 g of 2-hydroxy-2-methyl-1-phenyl-propan-1-one (photoinitiator) was then added.

9. 0.40 g of phenylbis(2,4,6-trimethylbenzoyl)-phosphine oxide (photoinitiator) was then added.

10. 0.07 g of fluorocarbon modified polysiloxane surfactant was then added.

11. The bottle was then placed into warm water to indirectly heat the coating mixture for a period of 45 minutes.

12. The coating composition was allowed to stir for 16 hours to ensure proper mixing.

The coating was applied to the convex side of five polycarbonate lenses by spin coating (Application spin speed: 800 rpm; Spin off speed: 950 rpm).

The coating was partially UV-cured using a Fusion Systems H+ bulb. The UV dosage is outlined in Table 1 above.

Next, the coated lenses were treated with a fluorinated top coating Optool (DSX®) as described in example 7 (after a corona treatment). The lenses were then washed and tested for top coat durability.

Results for examples 7 and 8:

Durability testing consists of measuring the water contact angle at t=0, after 4000 rubs using cheese cloth, and after 8000 rubs using cheese cloth. The results are below:

| Example | Initial Water Contact Angle | Water Contact Angle After 4000 Rubs | Water Contact Angle After 8000 Rubs |
| --- | --- | --- | --- |
| 7 | 119.3° | 117.5° | 116.5° |
| 8 | 120.3° | 119.2° | 116.8° |

Examples 9 and 10 (Compositions B and C, Respectively)

Examples 9 and 10 are the reproduction of respectively examples 7 and 8 except that the anti-fouling coating was directly applied to the partially UV-cured hard coating without the use of corona and cured for one (1) hour at 80° C. in a regular convection heat oven such as in example 1.

Durability testing, as described in examples 7 and 8 above, was performed on lenses of example 9 and 10, which preparation process did not use any surface preparation between curing of the UV hard coating and application of the anti-fouling coating. The results of this testing are shown below:

| Example | Initial Water Contact Angle | Water Contact Angle After 4000 Rubs | Water Contact Angle After 8000 Rubs |
| --- | --- | --- | --- |
| 9 | 117.6° | 115.3° | 114.4° |
| 10 | 118.1° | 116.3° | 114.9° |

Examples 11 and 12 (Compositions B and C, Respectively)

Examples 11 and 12 are the reproduction of respectively examples 9 and 10 (the anti-fouling coating is applied to the partially UV-cured hard coating without the use of corona) except that heat-curing step d) was done by using IR (Infrared) heat for 30 seconds at 370° C. using a LESCO EZ-IR cure system. The IR source was set to a temperature of 370° C. and the cycle time of the lens was 30 seconds at an approximate distance of 25 mm (2.5 cm) or approximately 1.0 inch from the source.

Durability testing, as described in example 7 and 8 above, was performed on lenses of examples 11 and 12 that did not use any surface preparation between curing of the UV hard coating and application of the anti-fouling coating. The results of this testing are below:

| Example | Initial Water Contact Angle | Water Contact Angle After 4000 Rubs | Water Contact Angle After 8000 Rubs |
| --- | --- | --- | --- |
| 11 | 119.3° | 117.5° | 116.5° |
| 12 | 117.3° | 114.3° | 109.8° |

The invention claimed is:

1. A process for obtaining a hard coated article having anti-fouling properties comprising:
 a) applying onto the surface of a substrate a hard coating polymerizable composition further defined as:
  i) a hard coating composition A comprising:
   at least one silicon compound having at least one hydrolyzable group directly linked to the silicon atom and at least one epoxy group, and/or a condensation compound thereof; and
   at least one cationic polymerization initiator; or
  ii) a hard coating composition B comprising:
   at least one epoxy compound which is neither a hydrolysis-polymerizable silicon compound nor a condensation compound thereof;
   less than 5% by weight of hydrolysis-polymerizable silicone compounds and condensation compounds thereof with respect to the weight of polymerizable compounds;
   less than 5% by weight of silazane compounds and condensation compounds thereof with respect to the weight of polymerizable compounds; and
   at least one cationic polymerization initiator; or
  iii) a hard coating composition C comprising:
   at least one epoxy compound which is neither a hydrolysis-polymerizable silicon compound nor a condensation compound thereof;
   at least one silicon compound having at least one hydrolyzable group directly linked to the silicon atom and at least one acryloxy or alkylacryloxy group, and/or a condensation compound thereof; and at least one cationic polymerization initiator;

b) activating the at least one cationic polymerization initiator to partially polymerize the hard coating composition, wherein the partial polymerization is made by polymerizing the hard coating composition in an oxygen comprising gas which partially inhibits polymerization;

c) depositing onto the partially polymerized hard coating composition an anti-fouling top coat composition;

d) submitting the article resulting from the preceding step to a heating step to cure the hard coating composition and the anti-fouling top coat composition; and e) recovering an article having a hard coat and an anti-fouling top coat deposited thereon and adhering to it.

2. The process of claim 1, wherein the oxygen comprising gas is air.

3. The process of claim 1, wherein the cationic polymerization initiator is a photoinitiator and the activation of b) is made by irradiation.

4. The process of claim 1, wherein the hard coating composition comprises at least one radical polymerization initiator.

5. The process of claim 1, wherein no activation treatment step of the surface of the applied hard coating composition is made before depositing the anti-fouling top coat composition.

6. The process of claim 1, wherein the hard coating composition is composition B and comprises less than 5% by weight of silicon compounds, with respect to the weight of polymerizable compounds.

7. The process of claim 1, wherein the hard coating composition is composition B and comprises no alkoxysilane compound.

8. The process of claim 1, wherein the hard coating composition is composition B and comprises no silicon compound.

9. The process of claim 1, wherein the hard coating composition A or the hard coating composition B comprises at least one epoxytrialkoxysilane.

10. The process of claim 9, wherein the epoxytrialkoxysilane is γ-glycidoxypropyltrimethoxysilane.

11. The process of claim 9, wherein the epoxytrialkoxysilane is not hydrolyzed.

12. The process of claim 9, wherein the epoxytrialkoxysilane is under a hydrolyzed form.

13. The process of claim 1, wherein the hard coat has a thickness ranging from 3 to 15 µm.

14. The process of claim 1, wherein the anti-fouling top coat composition comprises one or more fluorosilane.

15. The process of claim 14, wherein the fluorosilane comprises at least one perfluoropolyether group.

16. The process of claim 1, wherein the anti-fouling top coat has a thickness of from 2 to 50 nm.

17. The process of claim 1, wherein the hard coating composition is composition A and wherein composition A does not comprise any acrylic polymerizable compound.

18. The process of claim 1, wherein the hard coating composition is composition A and comprises from 5 to 100% by weight of silicon compounds having at least one hydrolyzable group directly linked to the silicon atom and at least one epoxy group and condensation compounds thereof, relative to the total weight of polymerizable compounds and any solid fillers contained in said composition.

19. The process of claim 1, wherein an activation treatment step of the surface of the applied hard coating composition is performed before depositing the anti-fouling top coat composition.

20. The process of claim 1, wherein said at least one hydrolyzable group directly linked to the silicon atom comprises at least one alkoxy group, halogen group, alkenyloxy group, acyloxy group, or substituted or unsubstituted amino group.

21. The process of claim 1, wherein the hard coating composition is composition A, wherein composition A further comprises at least one epoxy compound which is neither a hydrolysis-polymerizable silicon compound nor a condensation compound thereof.

22. The process of claim 1, wherein the hard coating composition further comprises at least one (meth)acrylate compound which is neither a hydrolysis-polymerizable silicon compound nor a condensation compound thereof.

23. The process of claim 1, wherein the hard coated article is further defined as comprising on the hard coat an anti-fouling top coat having a static contact angle with water of 111° or more and a thickness of 2-50 nm.

* * * * *